(12) United States Patent
Kim (10) Patent No.: US 7,536,751 B2
(45) Date of Patent: May 26, 2009

(54) MULTI-STEP HINGE AND PORTABLE TERMINAL HAVING SAME

(75) Inventor: Chang Soo Kim, Bucheon-si (KR)

(73) Assignee: Laird Technologies MAP Co., Ltd., Bucheon-Si, Gyeonggi-Do (KR)

( * ) Notice: Subject to any disclaimer, the term of this patent is extended or adjusted under 35 U.S.C. 154(b) by 144 days.

(21) Appl. No.: 11/806,535

(22) Filed: Jun. 1, 2007

(65) Prior Publication Data
US 2008/0274774 A1 Nov. 6, 2008

(30) Foreign Application Priority Data
May 3, 2007 (KR) ...................... 10-2007-0042839

(51) Int. Cl.
*E05D 11/10* (2006.01)
(52) U.S. Cl. .............................. 16/334; 16/297; 16/375
(58) Field of Classification Search .................. 16/334, 16/297, 375, 281, 284, 286, 303, 330, 342, 16/363; 379/433.13; 455/575.3; 381/680–683; 248/921–923
See application file for complete search history.

(56) References Cited

U.S. PATENT DOCUMENTS

| | | | | |
|---|---|---|---|---|
| 6,070,294 A | * | 6/2000 | Perkins et al. ................. | 16/252 |
| 6,085,387 A | * | 7/2000 | Han ............................. | 16/330 |
| 6,292,980 B1 | * | 9/2001 | Yi et al. ........................ | 16/303 |
| 6,745,436 B2 | * | 6/2004 | Kim ............................. | 16/330 |
| 7,100,244 B2 | * | 9/2006 | Qin et al. ...................... | 16/330 |
| 7,140,074 B2 | * | 11/2006 | Han et al. ..................... | 16/366 |
| 7,150,072 B2 | * | 12/2006 | Huang et al. .................. | 16/312 |
| 7,171,247 B2 | * | 1/2007 | Han ........................ | 455/575.3 |
| 7,173,825 B2 | * | 2/2007 | Han et al. ................... | 361/725 |
| 7,203,995 B2 | * | 4/2007 | Hsu et al. ..................... | 16/330 |
| 2006/0242795 A1 | * | 11/2006 | Duan et al. ................... | 16/330 |
| 2007/0039133 A1 | * | 2/2007 | Kim ............................. | 16/325 |
| 2007/0151078 A1 | * | 7/2007 | Kim et al. ..................... | 16/325 |

\* cited by examiner

*Primary Examiner*—William L. Miller
(74) *Attorney, Agent, or Firm*—Harness, Dickey & Pierce, P.L.C.

(57) ABSTRACT

Disclosed herein is a multi-step hinge. The hinge includes a housing. A rotary member is rotatably installed inside of the housing. The rotary member has a retainer groove formed in the outer circumferential face thereof. A stopper is slidably installed at either side of the rotary member inside of the housing. The stopper has a retainer protrusion formed so as to be engaged with the retainer groove. A resilient member is disposed between the housing and the stopper. A portable terminal having the multi-step hinge is also disclosed.

5 Claims, 8 Drawing Sheets

MULTI-STEP HINGE AND PORTABLE TERMINAL HAVING SAME

FIELD OF THE INVENTION

The present invention relates to a multi-step hinge and a portable terminal having the same. More specifically, the invention relates to an angular adjustable hinge and a portable terminal using the same.

BACKGROUND OF THE INVENTION

Throughout the description, a portable terminal means portable electronic devices including PDAs (Personal Digital assistant), smart phones, handheld personal computers, hand phones, MP3 players and the like. These devices may be equipped with a desired communications module such as CDMA (Code Divisions Multiplexing Access) module, Bluetooth module, IrDA (Infrared Data Association) module, or wired or wireless LAN card. In addition, such portable terminals may be provided with a desired microprocessor having a function of reproducing multi-media data, i.e., a desired computational ability.

Recently, portable terminals have been popularized for listening music, furthermore for watching movies or TVs according to the advent of satellite DMB (Digital Multimedia Broadcasting) and ground wave broadcasting.

As such, users are quite often bound to use those portable terminals for a long period of time.

Holding a portable terminal by hand for a long time causes the users to become physically tired.

As another problem, a longer antenna became required for the portable terminals to receive for example the satellite DMB service.

In order to receive the satellite DMB, diversity technique has been proposed, in which multiple antennas are employed, but which results in a bulky and heavier device (e.g., cellular phone).

The above problems in the art will be explained in details.

Figure 1:
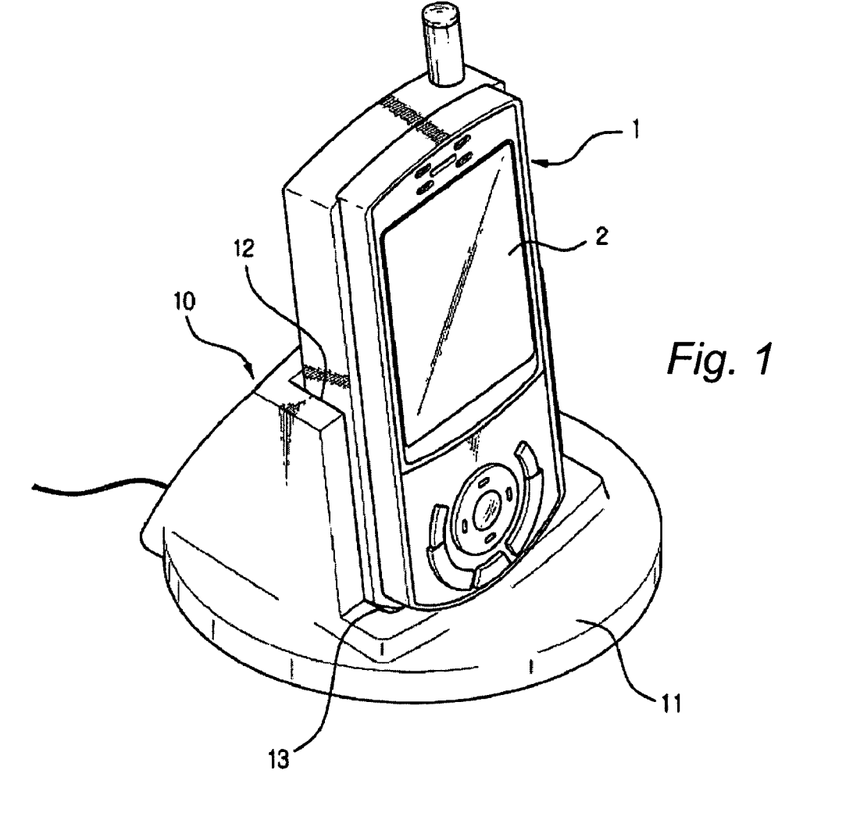
FIG. 1 shows a conventional portable phone and electric charging station.

FIG. 1 shows a conventional portable terminal and an electric charging station.

As shown in FIG. 1, the portable terminal 1 is placed in an electric charging station 10 to charge the terminal.

The bottom face 11 of the charging station 10 is flat so that the charging station can be placed on a floor such as desks and tables. On the top of the charging station 100 is formed a recess 13 where the portable terminal 1 is placed when it is charged.

The recess 13 of the charging station 10 is structured such that the portable terminal 1 rested therein remains inclined at a certain angle. Thus, a user can place the portable terminal on the recess 13 to watch movies or TV being displayed on the display 12 for a long time.

With this electric charging machine, the user can see the display 2 for a long time without excessive bowing of head and thus without excessive fatigue. However, inconveniently the users must carry the electric charging station 10.

In addition, the recess 13 of the charging station 10 has a fixed angular position and shape, so that the user can not arbitrarily adjust the angle of the portable terminal 1 with respect to the floor.

That is, the angle of the display 2 to the floor can not be adjusted according to the individual user's preferences and choices.

Figure 2:
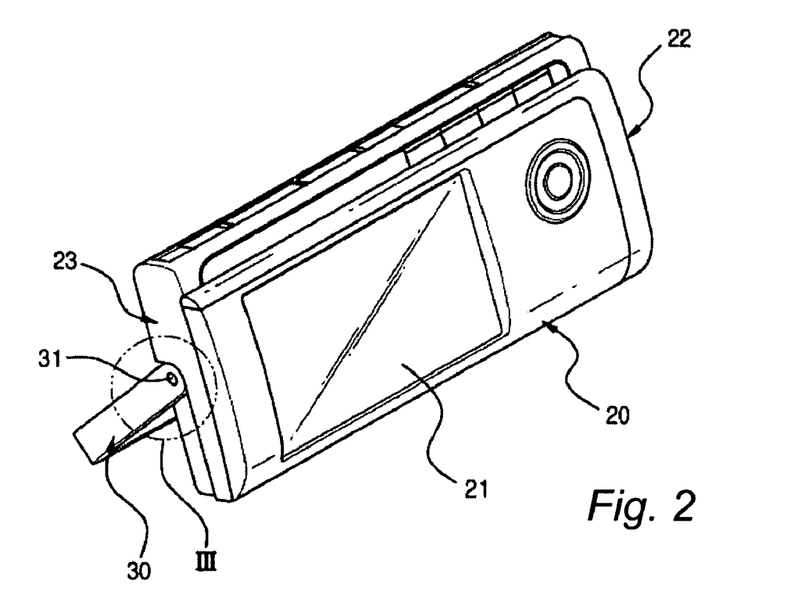
FIG. 2 shows another conventional portable terminal having a tilting device.
Figure 3:
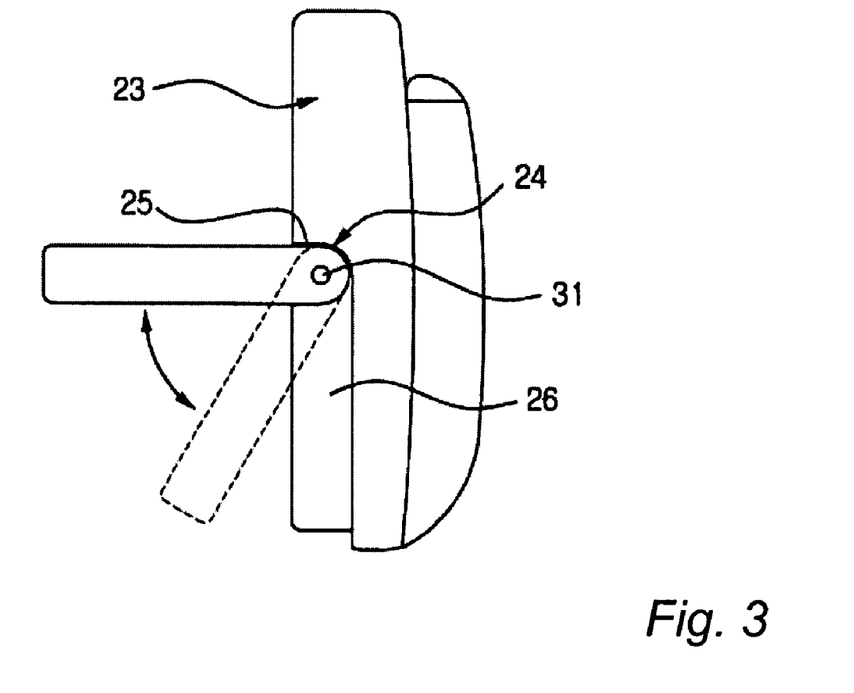
FIG. 3 is an enlarged view for the portion III in FIG. 2.

Referring to FIGS. 2 and 3, another conventional technique will be explained.

FIG. 2 is a perspective view of a portable terminal, i.e., a cellular phone having a tilting device. As shown in FIG. 2, the tilting device 30 is pivotally installed in a portable terminal 20 at both end faces 22 and 23 thereof.

The front face of the portable terminal 20 is formed with a display 21. The tilting device takes the form of "⊏", at both ends of which a hinge 31 is pivotally attached to both lateral faces of the portable terminal 20.

FIG. 3 is an enlarged view of the portion III in FIG. 2.

At both lateral sides of the portable terminal 20 is formed a stepped portion 24 for the tilting device 30 not to be protruded. The stepped portion 24 is made up of a step 25 and a flat portion 26.

The above "⊏" shaped tilting device 30 is combined to the flat portion 26 by means of a hinge 31. The hinge 31 pivots about near the step 26 to the extent of 90 degrees.

The "⊏" shaped tilting device 30 pivots near the hinge 31 and then is stopped by the step 25. At this state, the tilting device 30 contacts the floor and the bottom of the portable terminal 20 contacts the floor, such that the portable terminal is supported on the floor while forming a certain angle with the floor.

When the tilting device 30 is not being used, it can rest on the flat portion 26 of the stepped portion 24 to provide a convenient portability. With this technique, however, the tilting device supports the portable terminal 30 with a fixed inclination, i.e., 90-degree all the time.

SUMMARY OF THE INVENTION

The present invention has been made in order to solve at least part of the problems in the art. It is an object of the invention to provide a multi-step hinge and a portable terminal using the same.

In order to accomplish the above objects, according to one aspect of the invention, there is provided a multi-step hinge comprising a housing, a rotary member rotatably installed inside of the housing, and a stopper slidably installed at either side of the rotary member inside of the housing. The rotary member has a retainer groove formed in the outer circumferential face, and the stopper has a retainer protrusion formed so as to be engaged with the retainer groove. A resilient member is disposed between the housing and the stopper.

The retainer groove is formed in multiple numbers so as to extend along rotational axis of the rotary member, and the retainer protrusion is formed correspondingly to the retainer groove.

The stopper includes a front portion in which the retainer protrusion is formed, and a guide portion extended from the front portion so as to receive and support the resilient member.

The rotary member is formed with a rotation shaft and the housing is formed with an insert hole through which the rotation shaft passes. The rotation shaft is formed with a rotation limiter protrusion and the insert hole is formed with a rotation limiter step which engages the rotation limiter protrusion to restrict rotation of the rotary member within a predetermined angular range.

The rotation limiter protrusion protrudes from the outer face of the rotation shaft and is received in the insert hole, and the rotation limiter step protrudes from the inner face of the insert hole in a way to embrace part of the rotation shaft.

The stopper is disposed at one side of the rotary member, and a rotational support member is disposed at the other side of the rotary member so as to slidably contact and embrace the outer surface of the rotary member.

According to another aspect of the invention, there is provided a portable terminal comprising a main body equipped with a display unit, a support leg for supporting the main body, and a multi-step hinge hinge-combining the support leg with the main body. Here, the multi-step hinge has the above structure.

BRIEF DESCRIPTION OF THE DRAWINGS

Further objects and advantages of the invention can be more fully understood from the following detailed description taken in conjunction with the accompanying drawings in which.

DETAILED DESCRIPTION OF EXEMPLARY EMBODIMENTS OF THE INVENTION

Hereafter, exemplary embodiments of the invention will be explained, with reference to the accompanying drawings.

Figure 4:
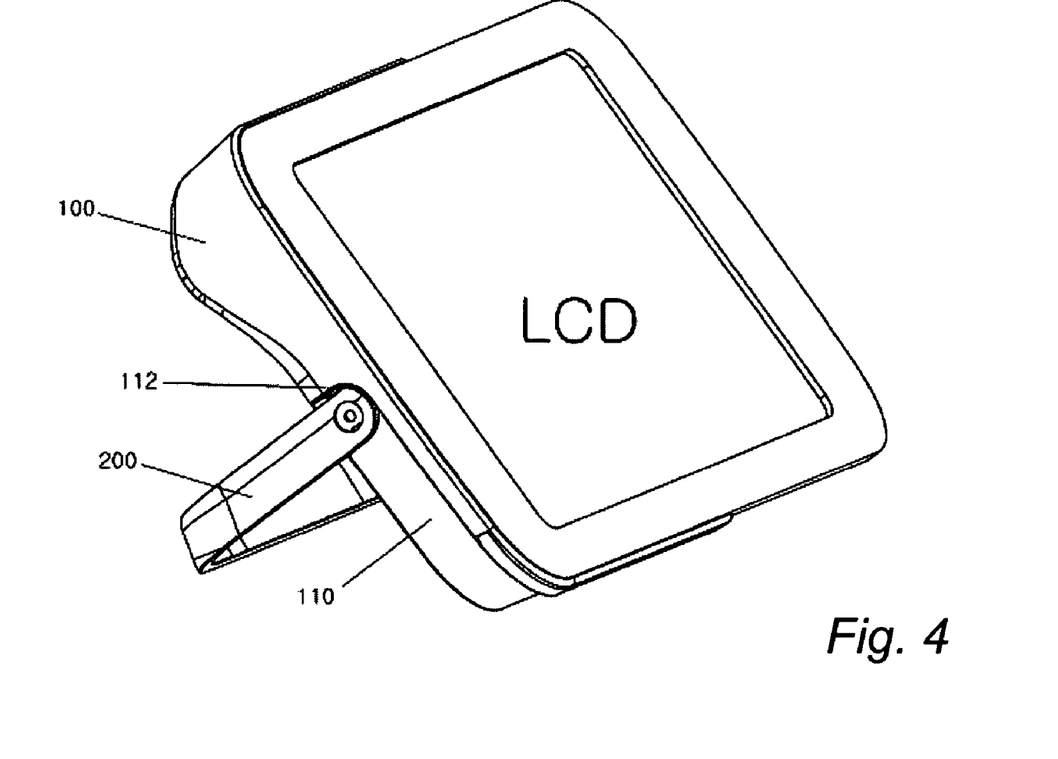
FIG. 4 is a perspective view of a portable terminal according to an embodiment of the invention.
Figure 5:
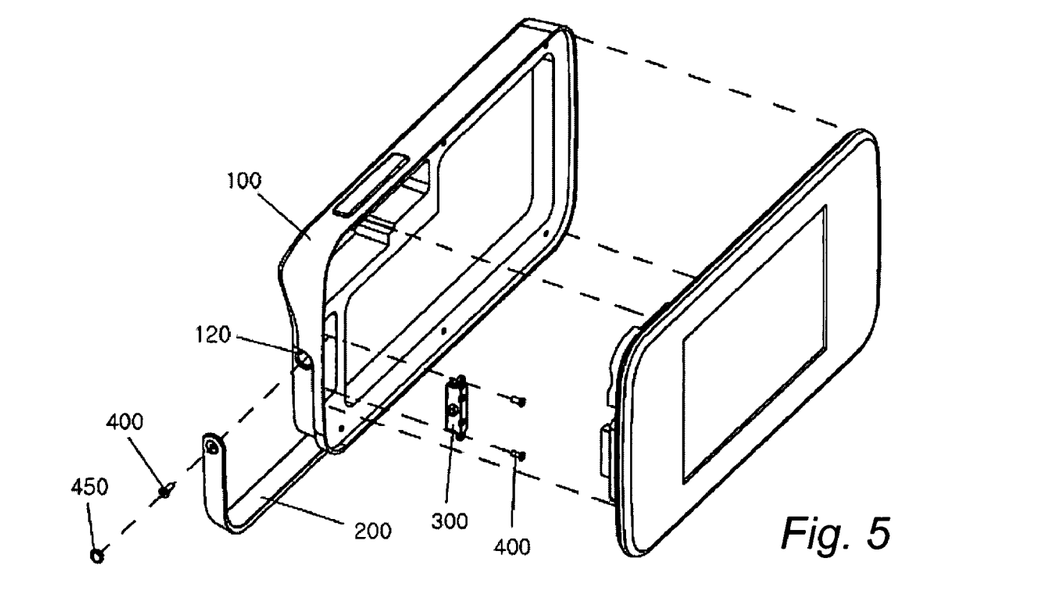
FIG. 5 is an exploded perspective view of the portable terminal of FIG. 4.

FIG. 4 is a perspective view of a portable terminal according to an embodiment of the invention and FIG. 5 is an exploded perspective view of the portable terminal.

Referring to FIGS. 4 and 5, the portable terminal of this embodiment includes a main body 100 equipped with a display, a support leg 200, and a multi-step hinge 300 pivotally connecting the main body and the support leg 200 to each other.

Part of the outer periphery of the main body 100 is depressed to form a recess 110 into which the support let 200 is inserted and rests thereon, when necessary. The depressed recess 110 forms a stepped-up portion 112 at both ends thereof, i.e., between the depressed recess 110 and the remaining un-depressed portion.

The support leg 200 is formed in the form of "ㄷ" so as to rest on the recess 110. Both ends of the support leg 200 are pivotally attached to the recess 110 by means of the multi-step hinge 300.

The support leg 200 is attached to the depressed recess 110 such that the end portion of the leg 200 is placed near the stepped-up portion 112 and thus the support leg 200 is stopped by the stepped-up portion 112, thereby not pivoting beyond the stepped-up portion.

Of course, the support leg 200 may be hinged directly to the main body 100, without the stepped-up portion 112 and the recess 110.

As shown in FIG. 5, the multi-step hinge 300 is mounted inside of the main body 100 by means of a bolt 400 or the like. The support leg 200 is coupled to the hinge 300 so as to be hinged with the main body 100.

For this purpose, the main body 100 is provided with a through-hole 120 formed at a desired position of the recess 110, through which the support leg 200 is combined with the multi-step hinge 300 using a bolt 400. A cap 450 or like is mounted so as not to expose the bolt or the like to the outside, thereby not spoiling the appearance.

Figure 6:
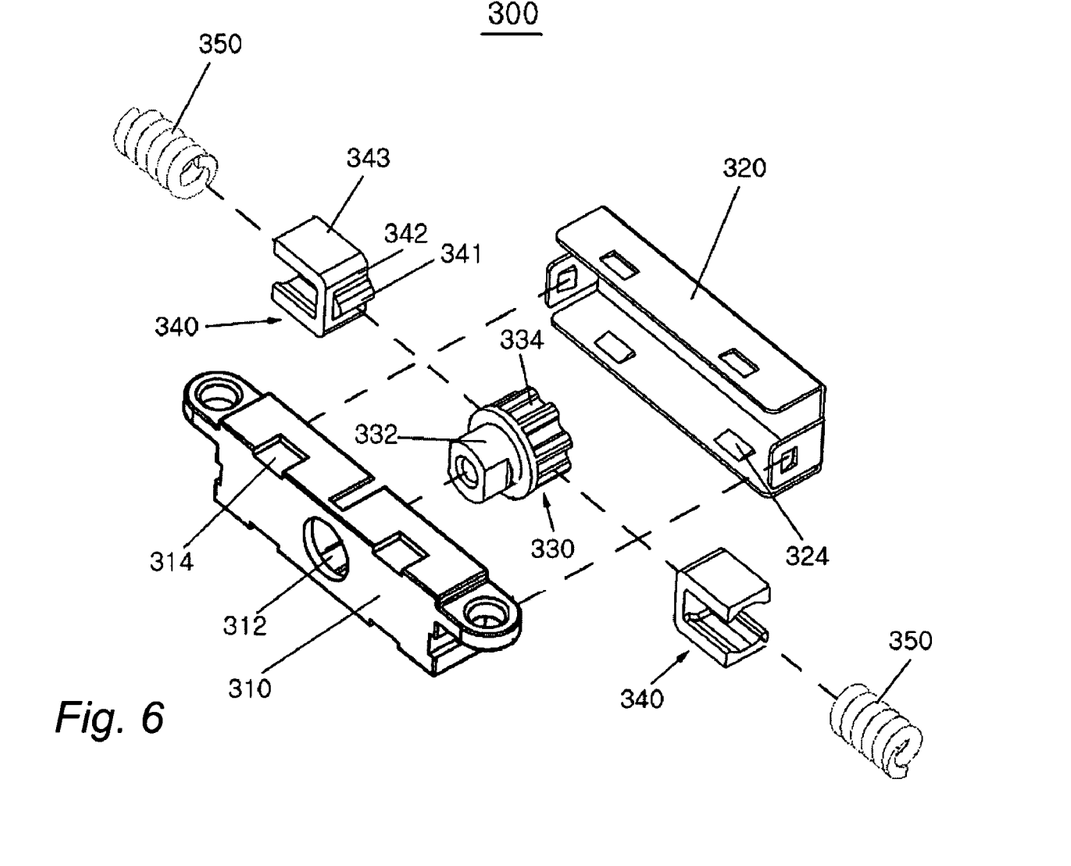
FIGS. 6 and 7 are exploded perspective views of a multi-step hinge according to an embodiment of the invention.
Figure 7:
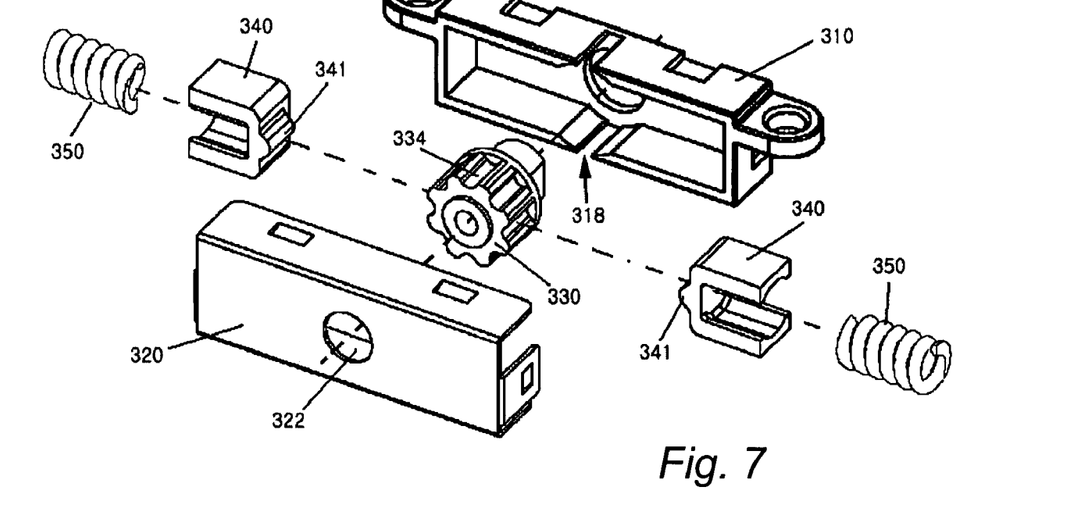

FIGS. 6 and 7 are exploded perspective views of a multi-step hinge 300 according to an embodiment of the invention.

Referring to FIGS. 5 to 7, the multi-step hinge 300 is composed of a housing 310, 320, a rotary member 330, a stopper 340 and a resilient member 350.

The housing is mounted inside of the main body 100, and composed of a male housing 320 and a female housing 310 to be combined with each other.

Here, the male housing 320 is formed with a latch protrusion 324 and the female housing 310 is formed with a latch groove 314 corresponding to the latch protrusion 324. Thus, the latch protrusion 324 is snap-inserted into the latch groove 314 to combine the male and female housings 320 and 310 with each other.

Of course, a fastener means such as bolts, or an adhesive may be used to combine the male housing 320 with the female housing 310.

The rotary member 330 takes a cylindrical form and is mounted inside of the housing 310 and 320. The rotary member 330 is provided with a retainer groove 334 formed at the outer face thereof.

The rotary member 330 is formed with a rotation shaft 332. The rotation shaft 332 passes through a first insert hole 312 or a second insert hole 322 and then is coupled to the support leg 200.

Therefore, as the support leg 200 pivots, the rotary member 330 rotates inside of the housing 310, 320 while being supported on the first and second insert holes 312 and 322.

The retainer groove 334 is formed in the outer circumferential face of the rotary member 330 in such a manner to extend lengthwise of the cylindrical rotary member 330.

Here, the retainer groove 334 is formed in multiple numbers along the outer circumference at certain angular intervals, for example, at regular intervals of 45-degree.

Further, formed at the top and bottom of the female housing 310 is a rotation recess 318 having an arcuate form so as to receive and accommodate the rotary member 330.

The stopper 340 is mounted inside of the housing 310, 320 so as to enable to slidably move towards and far away from the rotary member 330. The rotary member 340 may be disposed at either side of the rotary member 330 or at both sides thereof.

The stopper 340 includes a front portion 342 disposed adjacent to the rotary member 330, a guide portion 343 extended backwards of the front portion 342, and a retainer protrusion 342 formed in the front portion 342.

The retainer protrusion 341 becomes engaged with the retainer groove 334. The retainer protrusion and groove are rounded off so as to be smoothly engaged with and released from each other.

In addition, the retainer protrusion 341 is formed to extend correspondingly to the retainer groove 334 of the rotary member 330.

In this way, the retainer protrusion 341 and groove 334 come to have a larger contact surface to thereby further inhibit arbitrary moving relative to each other.

The guide portion 343 is formed in a way to extend backwardly from the top and lower end portions of the front portion 342. The resilient member 350 is inserted into the guide portion 343.

The resilient member 350 is formed of a coil spring or the like, which urges the stopper 340 towards the original position thereof.

Due to the resiliency of the resilient member 350, the retainer protrusion 341 of the stopper 340 is engaged with and retained on the retainer groove 334 of the rotary member, thereby preventing the rotary member 330 from being arbitrarily rotated.

At this time, the guide portion 343 has generally an arched structure configured so as to prevent the resilient member, i.e., the coil spring 350 from being escaped sideways.

Figure 8:
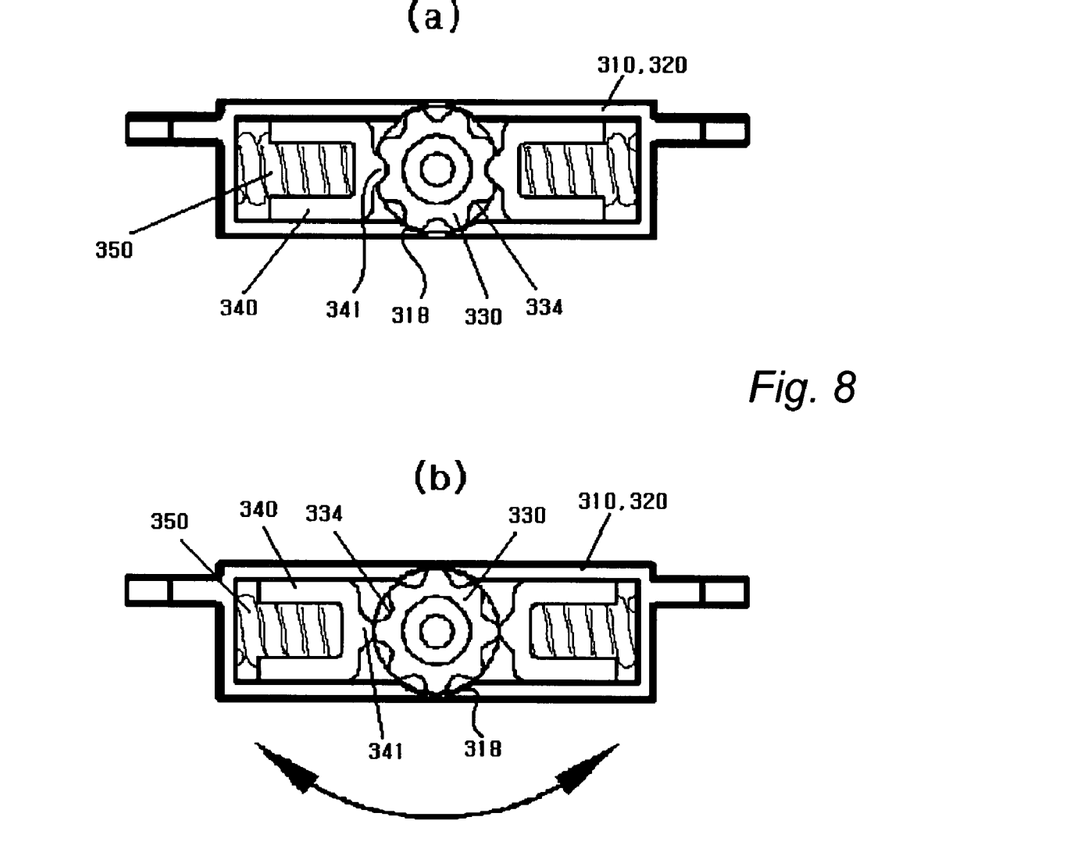
FIG. 8 shows operations of the multi-step hinge of FIGS. 6 and 7.

FIG. 8 shows operation of the multi-step hinge 300 having the above configuration.

As shown in FIG. 8(a), the retainer protrusion 341 of the stopper 340 is rested on the retainer groove 334 of the rotary member 330.

As shown in FIG. 8(b), as the rotary member 330 is rotated, the retainer protrusion 341 is released from the retainer groove 334 and thus the stopper 340 moves far away from the rotary member 350 while compressing the resilient member 350 backwards.

If the rotary member 330 is further rotated, the retainer protrusion 341 becomes rested onto an adjacent retainer groove 334, due to the restoring force of the resilient member, as shown in FIG. 8(a).

Here, the rotary member 330 can not be freely rotated by means of engagement between the retainer protrusion 341 and the retainer groove 334.

Since the support leg 200 is coupled to the main body 100 through the multi-step hinge 300 described above, the user can place the portable terminal on the floor at various angles with respect to the floor to view the display in more comfortable manner. Furthermore, because the retainer protrusion 341 of the stopper 340 remains firmly on the retainer groove 334 of the rotary member 330 by the elastic force of the resilient member 350, the support leg 200 is prevented from arbitrarily pivoting so that the portable terminal can remain at the state inclined with an angle set-up by the user.

Here, the intervals of the retainer grooves 334 formed in the rotary member 330 may vary and thus inclination angles of the main body 100 may be adjusted in various ways of angles.

Hereafter, another embodiment of the invention will be explained in detail, with reference to the accompanying drawings.

Figure 9:
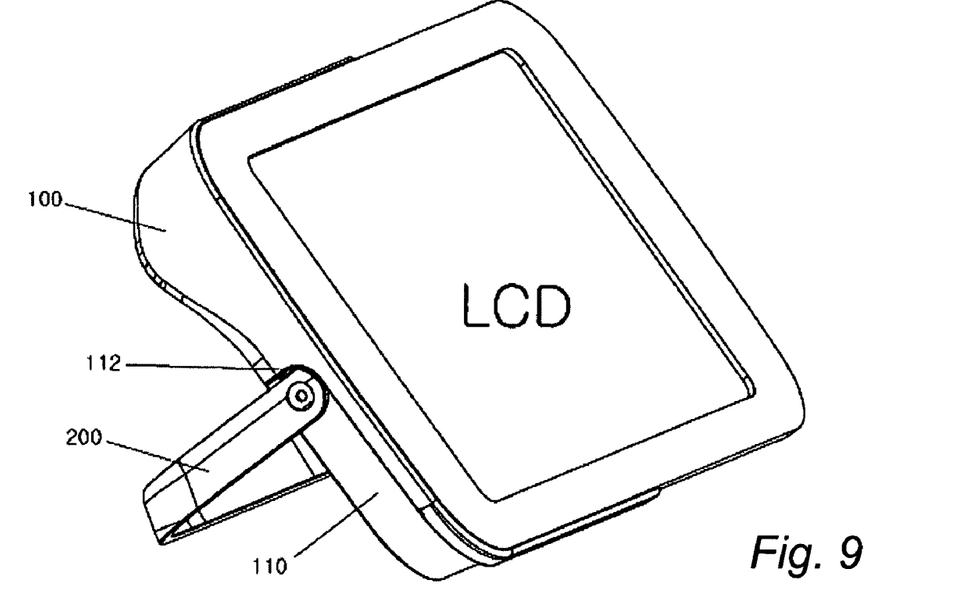
FIG. 9 is a perspective view of a portable terminal according to another embodiment of the invention.
Figure 10:
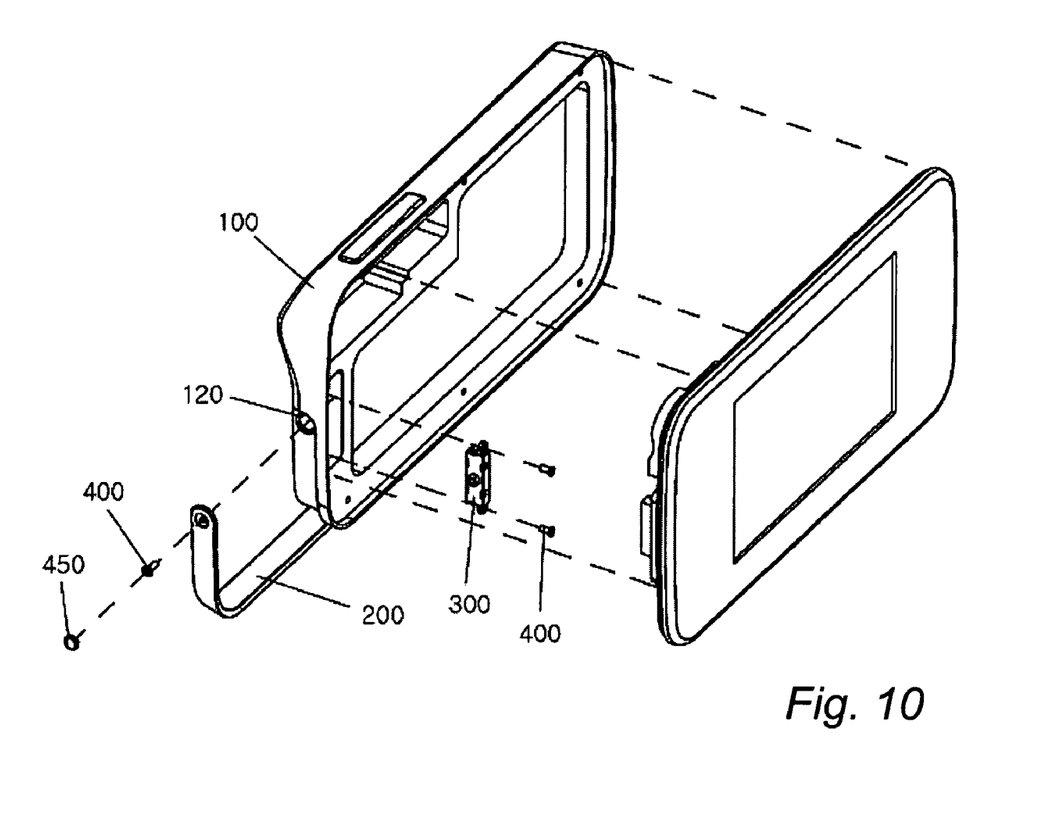
FIG. 10 is an exploded perspective view of the portable terminal of FIG. 9.

FIG. 9 is a perspective view of a portable terminal according to another embodiment of the invention and FIG. 10 is an exploded perspective view of the portable terminal.

Referring to FIGS. 9 and 10, the portable terminal of this embodiment includes a main body 100 equipped with a display, a support leg 200, and a multi-step hinge 300 pivotally connecting the main body 100 and the support leg 200 to each other.

Part of the outer periphery of the main body 100 is depressed to form a recess 110 into which the support let 200 is fitted and rests thereon, when necessary. The depressed recess 110 forms a stepped-up portion 112 at both ends thereof, i.e., between the depressed recess 110 and the remaining un-depressed portion.

The support leg 200 is formed in the form of "⊏" so as to rest on the recess 110. Both ends of the support leg 200 are pivotally attached to the recess 110 by means of the multi-step hinge 300.

The support leg 200 is attached to the depressed recess 110 such that the end portion of the leg 200 is placed near the stepped-up portion 112 and thus the support leg 200 is stopped by the stepped-up portion 112, thereby not pivoting beyond the stepped-up portion.

Of course, the support leg 200 may be hinged directly to the main body 100, without the stepped-up portion 112 and the recess 110.

As shown in FIG. 10, the multi-step hinge 300 is mounted inside of the main body 100 by means of a bolt 400 or the like. The support leg 200 is coupled to the hinge 300 so as to be hinged with the main body 100.

For this purpose, the main body 100 is provided with a through-hole 120 formed at a desired position of the recess 110, through which the support leg 200 is combined with the multi-step hinge 300 using a bolt 400. A cap 450 or like is mounted so as not to expose the bolt or the like to the outside, thereby not spoiling the appearance.

Figure 11:
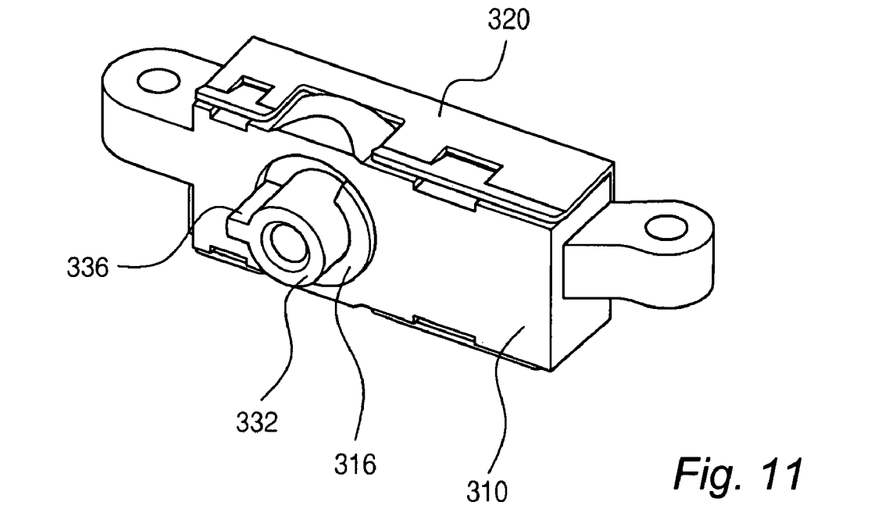
FIG. 11 is a perspective view of a multi-step hinge according to another embodiment of the invention.
Figure 12:
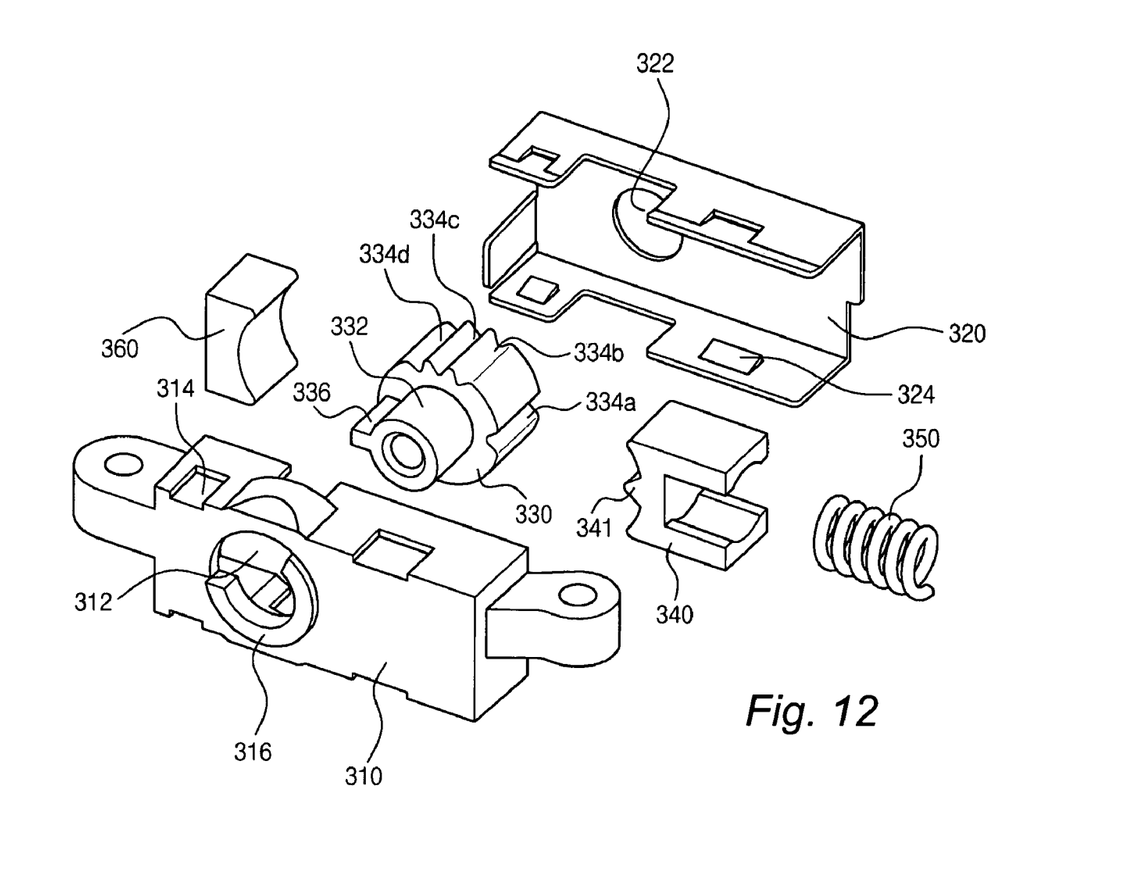
FIGS. 12 and 13 are exploded perspective views of the multi-step hinge of FIG. 11.
Figure 13:
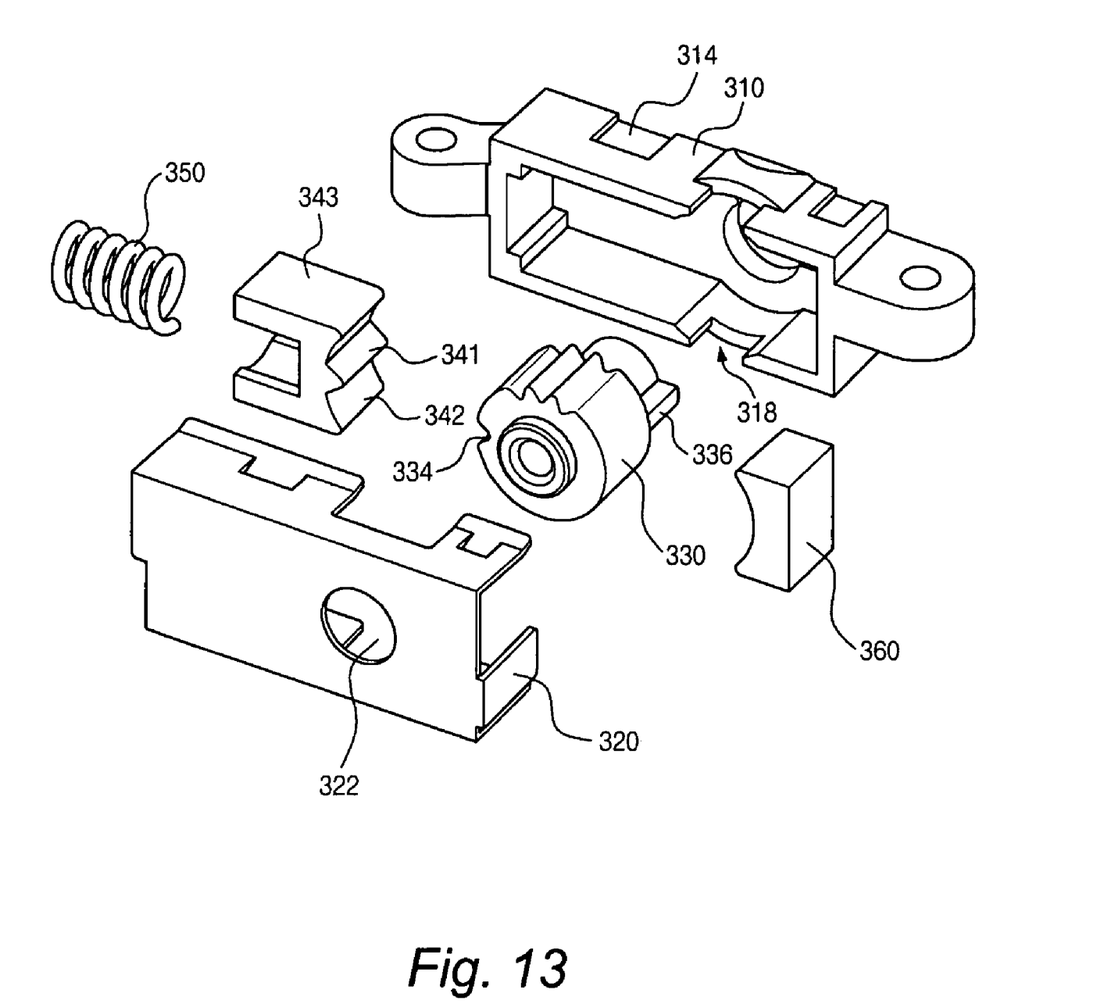

FIG. 11 is a perspective view of a multi-step hinge according to another embodiment of the invention. FIGS. 12 and 13 are exploded perspective views of the multi-step hinge of FIG. 11.

Referring to FIGS. 11 to 13, the multi-step hinge 300 is composed of a housing 310, 320, a rotary member 330, a stopper 340, a resilient member 350, and a rotational support member 360.

The housing is mounted inside of the main body 100, and composed of a male housing 320 and a female housing 310 to be combined with each other.

Here, the male housing 320 is formed with a latch protrusion 324 and the female housing 310 is formed with a latch groove 314 corresponding to the latch protrusion 324. Thus, the latch protrusion 324 is snap-inserted into the latch groove 314 to combine the male and female housings 320 and 310 with each other.

Of course, a fastener means such as bolts, or an adhesive may be used to combine the male housing 320 with the female housing 310.

Furthermore, the upper front edge portion of the male housing 320 is bent slightly upwards such that the female housing 310 can be easily inserted into the male housing 320 when being assembled.

The rotary member 330 takes a cylindrical form and is mounted inside of the housing 310 and 320. The rotary member 330 is provided with a retainer groove 334 formed at the outer face thereof.

The rotary member 330 is formed with a rotation shaft 332. The rotation shaft 332 passes through a first insert hole 312 or a second insert hole 322 and then is coupled to the support leg 200.

Therefore, as the support leg 200 pivots, the rotary member 330 rotates inside of the housing 310, 320 while being supported on the first and second insert holes 312 and 322.

The retainer groove 334 is formed in the outer circumferential face of the rotary member 330 in such a manner to extend lengthwise of the cylindrical rotary member 330.

Here, the retainer groove 334 is formed in multiple numbers along the outer circumference at certain angular intervals. Preferably, the distance between a first retainer groove 334a and a second retainer groove 334b is made longer than the distance between the second retainer groove 334b and a third retainer groove 334c.

In this way, unnecessary retainer grooves can be saved in the range of angles where the support leg 200 does not need to be retained for inclination-supporting the main body 100. That is, when slant-supporting the portable terminal, the support leg 200 can be turned up to a minimum angular position at one operation, without being obstructed by unnecessary retainer protrusions and grooves in-between.

Further, formed at the top and bottom of the female housing 310 is a rotation recess 318 having an arcuate form so as to receive and accommodate the rotary member 330.

The stopper 340 is mounted inside of the housing 310, 320 so as to enable to slidably move towards and far away from the rotary member 330. The rotary member 340 may be disposed at either side of the rotary member 330 or at both sides thereof.

The stopper 340 includes a front portion 342 to be placed towards to the rotary member 330, a guide portion 343 extended backwards of the front portion 342, and a retainer protrusion 342 formed in the front portion 342.

The retainer protrusion 341 becomes engaged with the retainer groove 334. The retainer protrusion and groove are rounded off so as to be smoothly engaged with and released from each other.

In addition, the retainer protrusion 341 is formed so as to extend correspondingly to the retainer groove 334 of the rotary member 330.

In this way, the retainer protrusion 341 and groove 334 come to have a larger contact surface to thereby further inhibit arbitrary moving relative to each other.

The front portion 342 is formed to be concaved generally in a way to wrap around the rotary member 330.

The guide portion 343 is formed in a way to extend backwardly from the top and lower end portions of the front portion 342. The resilient member 350 is inserted into the guide portion 343.

The resilient member 350 is formed of a coil spring or the like, which is disposed between the stopper 430 and the housing to urge the stopper 340 towards the original position thereof.

Due to the resiliency of the resilient member 350, the retainer protrusion 341 of the stopper 340 is engaged with and retained on the retainer groove 334 of the rotary member, thereby preventing the rotary member 330 from being arbitrarily rotated.

At this time, the guide portion 343 has in general an arched structure configured so as to prevent the resilient member, i.e., the coil spring 350 from being escaped sideways.

The stopper 340 is disposed at one side of the rotary member 330, and a rotational support member 360 is disposed at the other side of the rotary member 330 in a way to contact and wrap around the outer surface of the rotary member 330.

In other words, the rotational support member 360 is mounted to slidably embrace the rotary member 330, such that the rotary member 330 can be rotated in a steady and smooth manner without wobbling.

On the other hand, as shown in FIG. 12, the rotation shaft 332 is provided with a rotation limiter protrusion 336 formed at a desired position of the outer surface thereof. The first insert hole 312 is formed with a rotation limiter step 316 in the inner circumference, which allows the rotary member 330 to rotate within a predetermined range of angles, in cooperation with the rotation limiter protrusion 336 formed in the rotation shaft 332 of the rotary member 330.

The rotation limiter protrusion 336 may be formed in both sides of the rotation shaft 332. In this embodiment, it is formed at one side only of the rotation shaft 332 as shown in FIG. 12. Correspondingly, the rotation limiter step 316 may be formed at both the first insert hole 312 and the second insert hole 322. In this embodiment, it is formed at either one of the first and second insert holes 312 and 322 so as to correspond to the rotation limiter protrusion 336.

The rotation limiter protrusion 336 is inserted into the first insert hole 312, along with the rotation shaft 332. Thus, the radius of the first insert hole 312 is made to be slightly larger than the radius of the rotation shaft 332 plus the height of the rotation limiter protrusion 336.

The rotation limiter step 316 is formed so as to protrude from the inner face of the first insert hole so as to embrace part of the rotation shaft 332.

That is, the rotation limiter step 316 has a "C" shape to slidably wrap around part of the rotation shaft, which is allowed to rotate within the opening of the "C" shape. That is, the rotation limiter protrusion 336 is stopped by both ends of the "C" shape.

Figure 14:
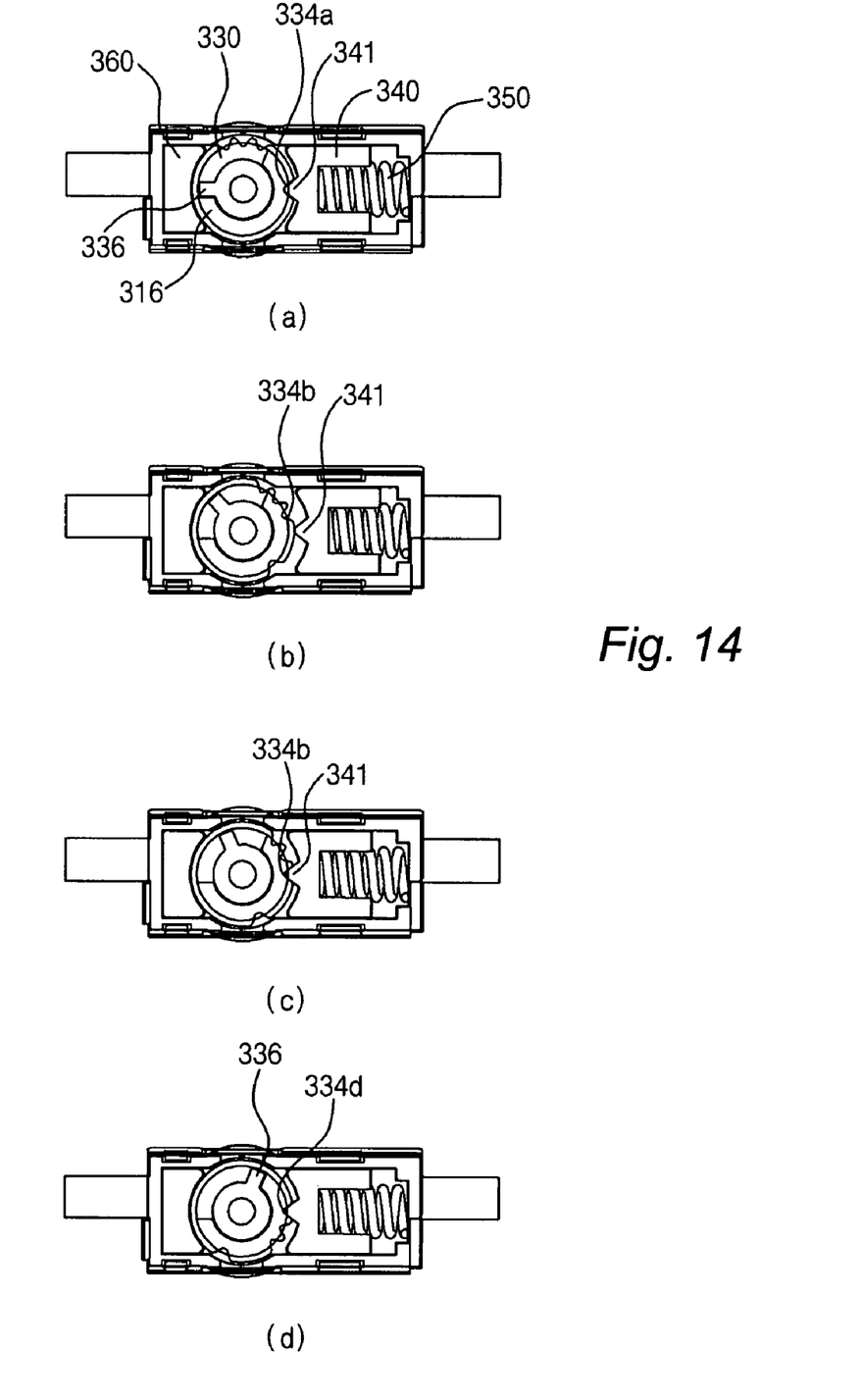
FIG. 14 shows operations of the multi-step hinge of FIG. 11.

FIG. 14 shows operation of the multi-step hinge having the above configuration.

As shown in FIG. 14(a), the retainer protrusion 341 of the stopper 340 is rested on the first retainer groove 334a of the rotary member 330.

As shown in FIG. 14(b), if the rotary member 330 is rotated, the retainer protrusion 341 is released from the first retainer groove 334a and thus the stopper 340 moves far away from the rotary member 350 while compressing the resilient member 350.

If the rotary member 330 is further rotated, the retainer protrusion 341 becomes rested onto the second retainer groove 334b, due to the restoring force of the resilient member, as shown in FIG. 14(c).

Here, the rotary member 330 can not be freely rotated by means of engagement between the retainer protrusion 341 and the second retainer groove 334b.

As the rotary member 330 is further rotated, the retainer protrusion 341 is rested onto the third retainer groove 334c and the fourth retainer groove 334d consecutively, as shown in FIG. 14(d). It can be seen from FIGS. 14(a) and 14(d) that the rotation limiter protrusion 336 is stopped by the rotation limiter step 316 to thereby inhibit further rotation of the rotation shaft 332, i.e., the rotary member 330.

Since the support leg 200 is coupled to the main body 100 through the multi-step hinge 300 described above, the user can place the portable terminal on the floor at various angles with respect to the floor to view the display in a more comfortable manner. Furthermore, because the retainer protrusion 341 of the stopper 340 remains firmly on the retainer groove 334 of the rotary member 330 by the elastic force of the resilient member 350, the support leg 200 is prevented from arbitrarily pivoting so that the portable terminal can remain at the state inclined with an angle set-up by the user.

Here, the intervals of the retainer grooves 334 formed in the rotary member 330 may vary and thus inclination angles of the main body 100 may be implemented in various ways of angles.

Further, the rotation limiter protrusion 336 and step 316 cooperates to avoid unnecessary rotation of the rotary member 330. The rotational support member 360 allows for smooth rotation of the rotary member 330, without wobbling.

Although the present invention has been described with reference to several exemplary embodiments, the description is illustrative of the invention and is not to be construed as limiting the invention. Various modifications and variations may occur to those skilled in the art, without departing from the spirit and scope of the invention, as defined by the appended claims.

What is claimed is:

1. A multi-step hinge comprising:
a housing;
a rotary member rotatably installed inside of the housing, the rotary member having a retainer groove formed in the outer circumferential face;
a stopper slidably installed at either side of the rotary member inside of the housing, the stopper having a retainer protrusion formed so as to be engaged with the retainer groove;
a resilient member disposed between the housing and the stopper;
wherein the rotary member is formed with a rotation shaft and the housing is formed with an insert hole through which the rotation shaft passes, and wherein the rotation shaft is formed with a rotation limiter protrusion and the insert hole is formed with a rotation limiter step which engages the rotation limiter protrusion to restrict rotation of the rotary member within a predetermined angular range.

2. The hinge as claimed in claim 1, wherein the retainer groove is formed in multiple numbers so as to extend along rotational axis of the rotary member, and the retainer protrusion is formed correspondingly to the retainer groove.

3. The hinge as claimed in claim 1, wherein the stopper includes a front portion in which the retainer protrusion is formed, and a guide portion extended from the front portion so as to receive and support the resilient member.

4. The hinge as claimed in claim 1, wherein the rotation limiter protrusion protrudes from the outer face of the rotation shaft and is received in the insert hole, and the rotation limiter step protrudes from the inner face of the insert hole in a way to embrace part of the rotation shaft.

5. The hinge as claimed in claim 1, wherein the stopper is disposed at one side of the rotary member, and a rotational support member is disposed at the other side of the rotary member so as to slidably contact and embrace the outer surface of the rotary member.

* * * * *